United States Patent
Schenk

[11] Patent Number: 6,111,386
[45] Date of Patent: Aug. 29, 2000

[54] METHOD FOR CONTROLLING AN ASYNCHRONOUS MACHINE

[75] Inventor: Robert Schenk, Schwierdingen, Germany

[73] Assignee: Robert Bosch GmbH, Stuttgart, Germany

[21] Appl. No.: 09/230,148

[22] PCT Filed: May 15, 1998

[86] PCT No.: PCT/DE98/01353

§ 371 Date: Dec. 1, 1999

§ 102(e) Date: Dec. 1, 1999

[87] PCT Pub. No.: WO98/53551

PCT Pub. Date: Nov. 26, 1998

[30] Foreign Application Priority Data

May 16, 1997 [DE] Germany .............. 197 20 697

[51] Int. Cl.[7] .......................................... H02P 5/28
[52] U.S. Cl. .................. 318/799; 318/139; 318/809
[58] Field of Search .......................... 318/727–832, 318/432, 434, 139

[56] References Cited

U.S. PATENT DOCUMENTS

| | | | |
|---|---|---|---|
| 4,215,305 | 7/1980 | D'Atre et al. ........................ | 318/803 |
| 4,823,066 | 4/1989 | Yoshiki et al. ....................... | 318/798 |
| 5,388,052 | 2/1995 | Mann ................................... | 318/800 |
| 5,479,081 | 12/1995 | Seibel et al. ........................ | 318/805 |
| 5,565,752 | 10/1996 | Jansen et al. ....................... | 318/807 |
| 5,585,709 | 12/1996 | Jansen et al. ....................... | 318/807 |

OTHER PUBLICATIONS

Grotstollen H. et al., "Betrieb Der Asynchronmaschine Im Feldschwaechbereich," May 1, 1994, pp. 484, 487–488, 490–491.

*Primary Examiner*—David Martin
*Attorney, Agent, or Firm*—Kenyon & Kenyon

[57] ABSTRACT

A method for controlling an asynchronous machine which is operated below a cutoff frequency in the base speed region with variable magnetization current and above a cutoff frequency in a field control speed region is provided. The maximum possible fundamental oscillation of a stator voltage is determined from a existing intermediate circuit voltage or battery voltage and a stator current is defined as a setpoint and impressed onto the asynchronous machine. A calculation is made of a rotor frequency needed, with that definition of the stator voltage to impress the current setpoint. A rotor frequency which corresponds to the current setpoint is compared via a control characteristic curve to the calculated rotor frequency and that rotor frequency value which is the greater of the two is used to determine the current setpoint. The method is advantageously performed with a microprocessor, with which the calculation algorithm may be executed rapidly, effectively, and contemporaneously. Optimum utilization of available energy is thus made possible, in particular for applications in electric vehicles.

9 Claims, 5 Drawing Sheets

METHOD FOR CONTROLLING AN ASYNCHRONOUS MACHINE

FIELD OF THE INVENTION

The present invention relates to a method for controlling an asynchronous machine that is operated below a cutoff frequency in a base speed region with variable magnetization current, and above the cutoff frequency in a field control speed region.

BACKGROUND INFORMATION

For applications which do not require high dynamics, speed-controlled asynchronous machines are operated on frequency converters. Proceeding from a nominal point of the asynchronous machine, a ratio of phase voltage $U_1$ to stator frequency $f_1$ is kept constant as the speed decreases, as is evident from the characteristic curve in FIG. 1. The result is a magnetization current $I_m$ that is constant at each speed n and also independent of load. The nominal point of the asynchronous machine is selected so that at a given intermediate circuit voltage $U_{zw}$, the asynchronous machine may still absorb the nominal magnetization current. If the rotation speed n is raised above that point, the voltage $U_1$ may not be kept proportional to the stator frequency $f_1$, but rather remains constant. The magnetization current $I_m$ thus assumes a value proportional to $U_{1max}/n$, since stator frequency $f_1$ (ignoring the slight slippage) in turn behaves proportionally with respect to speed n, as depicted in FIG. 2 using a 1/n control curve. It should be noted with respect to this approach that it is simple, robust, and sufficient for many applications.

For highly dynamic drive systems, a field-oriented control system, which allows rapid torque adjustments, is generally accepted. In this, an excitation current is set using the U/f control principle, i.e. such that in the base speed region, the magnetization current $I_m$ is kept constant up to the cutoff point, cutoff frequency, or cutoff speed $n_{eck}$. In addition, at higher frequencies the magnetization current $I_m$ is decreased in a field control speed region in accordance with the 1/n characteristic curve, as is evident from the characteristic curve shown in FIG. 2. Since both the intermediate circuit voltage and the magnetization current are constant, the cutoff point also does not change. A control mode of this kind is also the basis of the one described in an article by H. Grotstollen and J. Wiesing in ETZ, Vol. 115 (1994) No. 9, pp. 486–491, entitled "Betrieb Der Asynchronmaschine Im Feldschaechbereich."

Applications of adjustable-speed drives such as those in electric vehicles require the maximum possible utilization of the available energy at every operating point. In the base speed region (i.e. for speeds below the nominal speed or cutoff speed $n_{eck}$), the magnetization current $I_m$ control function described above results in a low efficiency under partial load.

In the base speed region, the optimum distribution of the stator current $I_1$ into magnetization current $I_m$ and rotor current $I_2$ may be calculated for each value of the stator current $I_1$. For a given stator current $I_1$, this distribution may be established by way of the rotor frequency $f_2$. The pertinent value pairs in each case may be represented in tabular form or in a control characteristic curve such as the one shown in FIG. 3. With this control method, the operating point is thus defined via the stator current $I_1$ and rotor frequency $f_2$ using a current-slip method.

With this method as well, the stator voltage $U_1$ rises as the current and the speed increase. Maximum stator voltage is reached at the cutoff speed $n_{eck}$. This cutoff speed $n_{eck}$ depends, however, on the magnitude of the stator current $I_1$, since for a lower stator current $I_1$ the corresponding magnetization current $I_m$ is also lower, and the induced stator voltage $U_1$ is correspondingly lower as well. At a lower stator current $I_1$ the voltage limit is thus not reached until a higher speed n, as is apparent from the characteristic curve in FIG. 4.

When the asynchronous machine is used for drive systems of electric vehicles, the cutoff speed is also determined by a battery voltage. The battery voltage fluctuates depending on a charge state and the load. Minimum operating voltages that are typical for modern traction batteries, with no-load voltages of 300 V, are approximately 200 V for drive and up to 400 V for regeneration. Corresponding to these different voltage values, a different cutoff speed $n_{eck}$ occurs in each case.

For operation beyond the voltage limit curve, torque- or efficiency-optimized operation is achieved in each case with utilization of the maximum voltage.

In the case of the current-slip control system, there thus exists the object of establishing the rotor frequency $f_2$ which is appropriate for the respective current at the instantaneous voltage of the battery or the intermediate circuit.

In a control system applied in a VW hybrid, this object is achieved by an electronic circuit. This electronic control circuit, however, allows time constants to be adjusted only by changing components. This is therefore very rigid or cumbersome, and thus does not promote utilization in a vehicle.

A way is therefore being sought to replace this control circuit with a method that is flexible, economical, and easy to implement, if possible using components which are already available.

SUMMARY OF THE INVENTION

The method according to the present invention for controlling an asynchronous machine has, by comparison with the conventional methods, the advantage that the available battery voltage or intermediate circuit voltage is optimally utilized while exploiting the available voltage limits, both in the base speed region and in the field-controlled speed region, since the rotor frequency appropriate for the existing values is determined very contemporaneously, and may be used for the control system.

According to the present invention, this is achieved in principle in that the maximum possible fundamental oscillation of the stator voltage is determined from the existing intermediate circuit voltage or battery voltage; a stator current is defined as a setpoint and impressed upon the asynchronous machine; a calculation is made of the rotor frequency needed, with that definition of the stator voltage, to impress the current setpoint; the rotor frequency which corresponds, by way of the control characteristic line, to the current setpoint is compared to the calculated rotor frequency; and that rotor frequency value which is the greater of the two is used to determine the current setpoint.

A first advantageous embodiment provides, in the interest of current and contemporaneous determination of the corresponding rotor frequency, for the calculation of the value of the rotor frequency to be performed at specific sampling time intervals.

A further embodiment of the method according to the present invention, which improves the efficiency, provides for the calculation of the rotor frequency in such a way that both in the base speed region and in the field control speed region the asynchronous machine is operable or operated at the voltage limit in each case.

In order to ensure optimum efficiency and optimum utilization of the available supply voltage in each case, even at different temperatures, according to an advantageous embodiment of the method according to the present invention, the calculation of the rotor frequency is performed with values for the basic frequency and/or magnetization current and/or Ohmic rotor resistance that are corrected on the basis of temperature influences.

According to a particularly advantageous embodiment of the present invention, the calculation of rotor frequency is performed with a microprocessor, so that it may be determined very flexibly and promptly.

One particularly advantageous calculation procedure for the method according to the present invention is the basis for the subject matter of a further advantageous embodiment of the present invention. According to this advantageous embodiment, the calculation of the rotor frequency is performed according to the following fundamental sequence:

Initialize at specific times;
Define the current setpoint;
Determine the basic rotor frequency associated therewith, optionally compensating for temperature;
Calculate the stator voltage;
Calculate the main magnetization voltage as a function of the phase angle;
Calculate the magnetization current;
Calculate the rotor current;
Calculate the rotor frequency;
Limit the calculated rotor frequency to a value lower than one corresponding to the breakover frequency;
Calculate the phase angle;
Determine if the calculated rotor frequency is higher than the basic rotor frequency;
If so, set the secondary rotor frequency equal to the calculated rotor frequency;
If not, set the secondary rotor frequency equal to the basic rotor frequency;
Lastly, return to the beginning of the calculation sequence.

In an advantageous and preferable fashion, the method according to the present invention is used in battery-powered asynchronous machines in electric vehicles.

DETAILED DESCRIPTION

Figure 1:
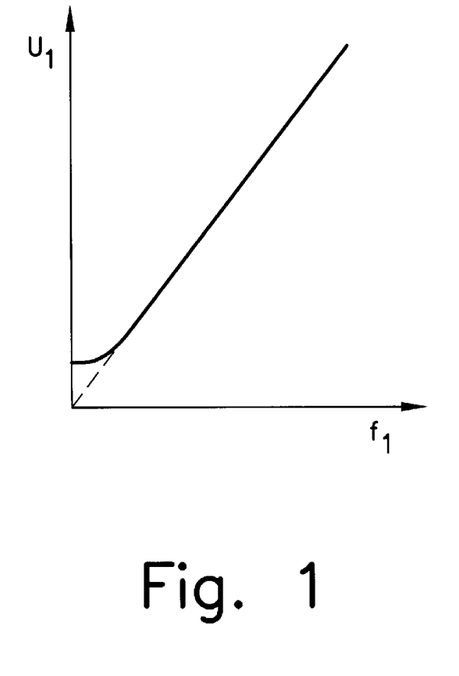
FIG. 1 shows a characteristic curve for stator voltage or phase voltage $U_1$ plotted against stator frequency $f_1$, the ratio of which is substantially constant.
Figure 2:
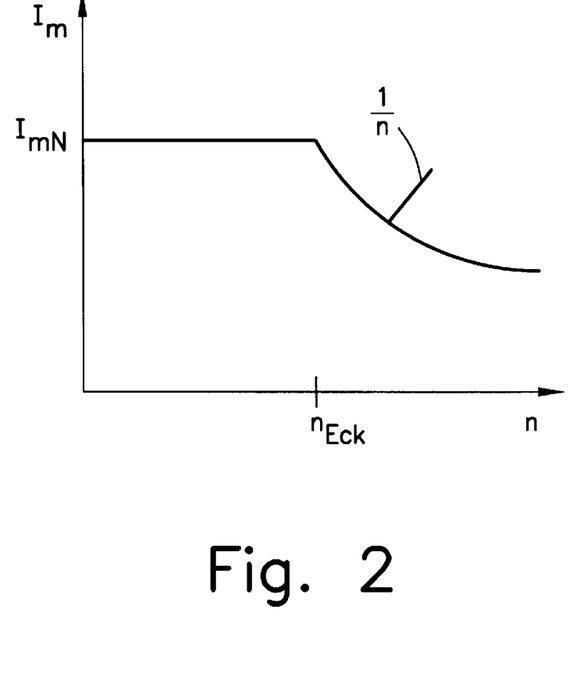
FIG. 2 shows a characteristic curve for magnetization current $I_m$ plotted against speed n, nominal magnetization current $I_{mN}$ being constant up to cutoff speed $n_{eck}$.

FIG. 1 shows the characteristic curve for phase voltage $U_1$ plotted against stator frequency $f_1$. The ratio between these two variables is substantially constant. This characteristic curve serves in particular to depict the conditions in speed-controlled asynchronous machines in which stringent demands are not made in terms of dynamics, and which are driven from frequency converters. In this, proceeding from the nominal point of the asynchronous machine, the ratio of phase voltage $U_1$ to stator frequency $f_1$ is kept constant as speed decreases. The result is a magnetization current $I_m$ that is constant at every speed and also independent of load.

This is reproduced in the characteristic curve depicted in FIG. 2. FIG. 2 shows magnetization current $I_m$ plotted against speed n, the nominal magnetization current $I_{mN}$ being constant up to the cutoff speed $n_{eck}$. Above the cutoff speed $n_{eck}$, the magnetization current $I_m$ decreases inversely with speed, i.e. as 1/n. The nominal point of the asynchronous machine is selected so that at the given battery voltage or the given intermediate circuit voltage $U_{wz}$, the asynchronous machine may still just absorb the nominal magnetization current. If the speed n is increased above that point, the voltage $U_1$ may not be kept proportional to the stator frequency $f_1$ by the converter, but rather remains constant. The magnetization current $I_m$ thus assumes a value proportional to $U_{1max}/n$, since the stator frequency $f_1$ (leaving aside the slight slippage), is once again behaving proportionally with respect to the speed n, as depicted in FIG. 2 by the 1/n control curve.

Figure 3:
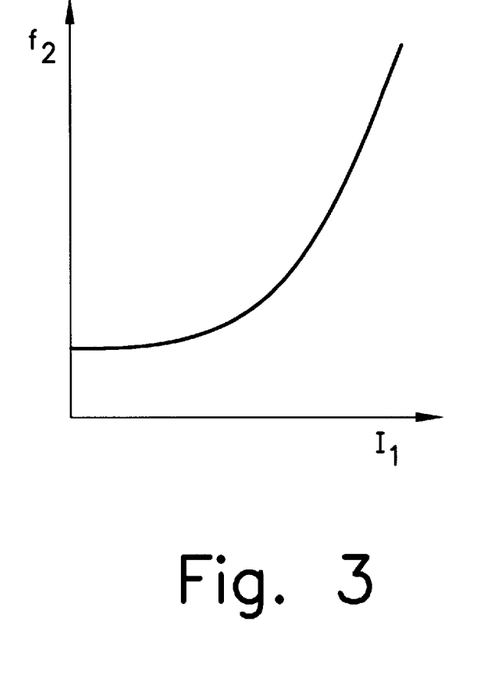
FIG. 3 shows a non-linear characteristic curve for rotor frequency $f_2$ plotted against stator current or phase current $I_1$.

In FIG. 3, the non-linear characteristic curve for rotor frequency $f_2$ is plotted as a function of stator current $I_1$. In the base speed region, for each value of the stator current $I_1$ the optimum distribution of the stator current $I_1$ into magnetization current $I_m$ and rotor current $I_2$ may be calculated. This distribution may be set, for a given stator current $I_1$, via the rotor frequency $f_2$. The relevant value pairs in each case may be depicted in tabular form or in a control characteristic curve, as shown in FIG. 3. With this control method, the operating point is therefore defined via the stator current $I_1$ and rotor frequency $f_2$, using the current-slip method.

With this method as well, the stator voltage $U_1$ rises with increasing current and increasing speed. The maximum stator voltage is reached at the cutoff speed $n_{eck}$. This cutoff speed $n_{eck}$ depends, however, on the magnitude of the stator current $I_1$, since for a lower stator current $I_1$ the associated magnetization current $I_m$ is also lower, and the induced stator voltage $U_1$ is also correspondingly lower. At a lower stator current $I_1$, the voltage limit is thus not reached until a higher speed n, as is evident from the characteristic curve shown in FIG. 4.

Figure 4:
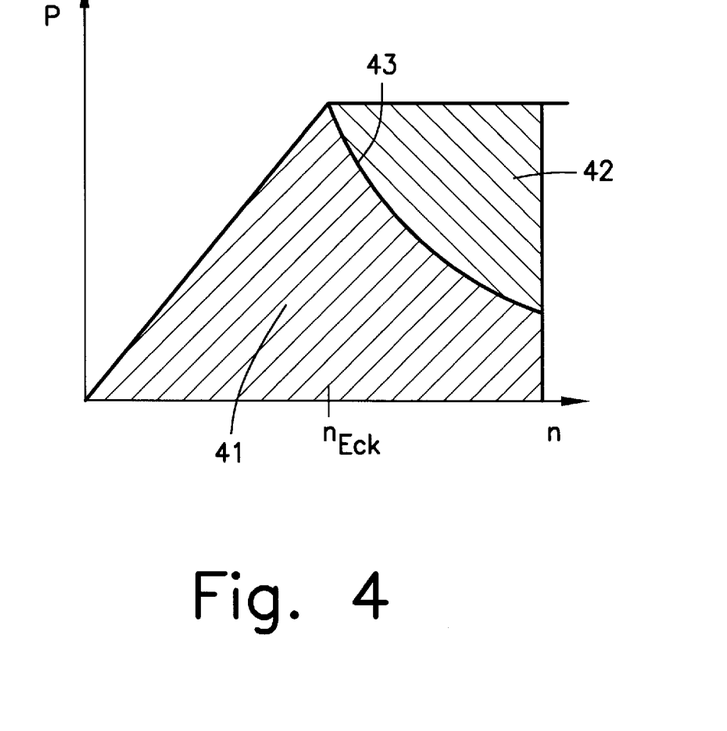
FIG. 4 shows the output P, and thus also voltage and current, plotted against speed n, showing the base speed region and the field control speed region as well as the voltage limit.

FIG. 4 depicts the output P, and thus also the voltage and current, plotted against speed n, with base speed region 41 and field control speed region 42 as well as voltage limit 43. As Figure shows, it may be stated in this case that the base speed region is expanded beyond the cutoff speed $n_{eck}$. With this method as well, the stator voltage $U_1$ rises as the current and speed increase. The maximum stator voltage is reached at the cutoff speed $n_{eck}$. This cutoff speed $n_{eck}$ depends, however, on the magnitude of the stator current $I_1$, since at a lower stator current $I_1$ the associated magnetization current $I_m$ is also lower, and the induced stator voltage $U_1$ is also correspondingly lower. At a lower stator current $I_1$, the voltage limit is thus not reached until a higher speed n than the one corresponding to the cutoff speed $n_{eck}$, as is evident from the characteristic curve shown in FIG. 4.

As already stated initially, when the asynchronous machine is used for drive systems of electric vehicles, the cutoff speed is also determined by the battery voltage. The battery voltage fluctuates depending on the charge state and the load. Minimum operating voltages that are typical for modern traction batteries, with no-load voltages of 300 V, are approximately 200 V for drive and up to 400 V for regeneration. Corresponding to these different voltage values, a different cutoff speed $n_{eck}$ occurs in each case.

The method according to the present invention makes available an algorithm or a calculation method which is used to recognize when the voltage limit has been reached, and with which, as the speed increases further, raises the rotor frequency $f_2$ in such a way, or defines for it a value such, that precisely the available voltage is utilized.

The method according to the present invention determines, from the available intermediate circuit voltage or battery voltage $U_B$, the maximum possible fundamental oscillation of the phase voltage or stator voltage $U_1$; defines a phase current or stator current $I_1$ as a setpoint and impress it onto the machine; and calculates the rotor frequency $f_{alg}$ needed, with the stator voltage $U_1$, to impress the current setpoint $I_1$. By way of the characteristic curve—present in table form or as depicted in FIG. 3—the rotor frequency $f_2$ corresponding to the current setpoint $I_1$ is compared with the calculated rotor frequency $f_{alg}$. The rotor frequency value which is the greater of the two is employed to determine the current setpoint $I_1$.

The calculation of the rotor frequency $f_{alg}$ is performed at specific sampling time intervals $T_A$. This makes possible a contemporaneous determination of the rotor frequency $f_2$ that is most suitable for best utilizing the available voltage. In addition, the calculation of the rotor frequency $f_{alg}$ is performed in such a way that both in the base speed region and in the field control speed region, the asynchronous machine is operable or operated at the voltage limit in each case.

Since the essential parameter values are dependent on temperature, values corrected for temperature influences are used in the calculation of the rotor frequency $f_{2alg}$. This is particularly true for the basic frequency $f_2$, the magnetization current $I_m$, and the Ohmic rotor resistance $R_2'$.

The calculation of the rotor frequency $f_{2alg}$ is advantageously performed with a processor, in particular a microprocessor.

In order to explain the transition from the base speed region to the field control speed region, it will be assumed that the asynchronous machine is initially operated in the base speed region, and that the speed is then increased. The current setpoint is to remain unchanged during this operation. By way of the characteristic curve shown in FIG. 3, this current $I_1$ is associated with a specific value for the rotor frequency $f_{2grund}$. At specific time intervals $T_A$, the microprocessor calculates the value $f_{2alg}$ for the rotor frequency. In the base speed region, $f_{2alg}$ is always less than $f_{2grund}$, since the voltage limit has not yet been reached. When a speed increase occurs, the value of $f_{2alg}$ becomes greater since the proportion of rotor current $I_1$ thereby rises, while the magnetization current $I_m$ drops. When the stator voltage $U_1$ then reaches its maximum possible value at the cutoff point at a speed $n_{eck}$, the two frequency values $f_{2grund}$ and $f_{2alg}$ are identical. As the speed increases further, $f_{2alg}$ becomes greater than $f_{2grund}$. The value for the rotor frequency $f_{2alg}$ determined via the calculation or algorithm now defines the rotor frequency and thus distributes the currents. As is clear from the above description, in each of the two speed regions, the value of frequency $f_{2grund}$ or $f_{2alg}$ which is the greater of the two is always selected. A continuous transition between the two control modes is thus achieved, and undesired torque peaks are avoided.

Figure 5A:
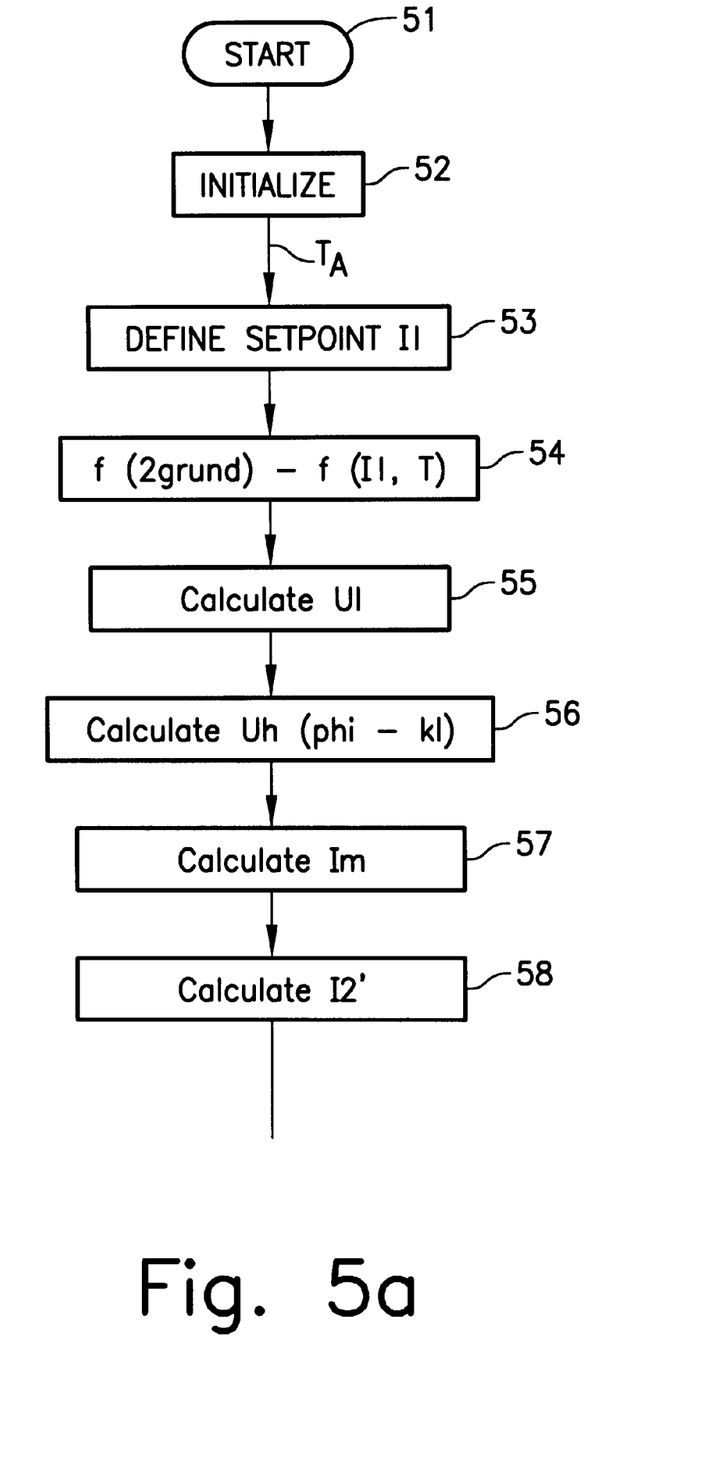
FIG. 5 schematically shows a flow chart for calculating the rotor frequency $f_{alg}$.
Figure 5B:
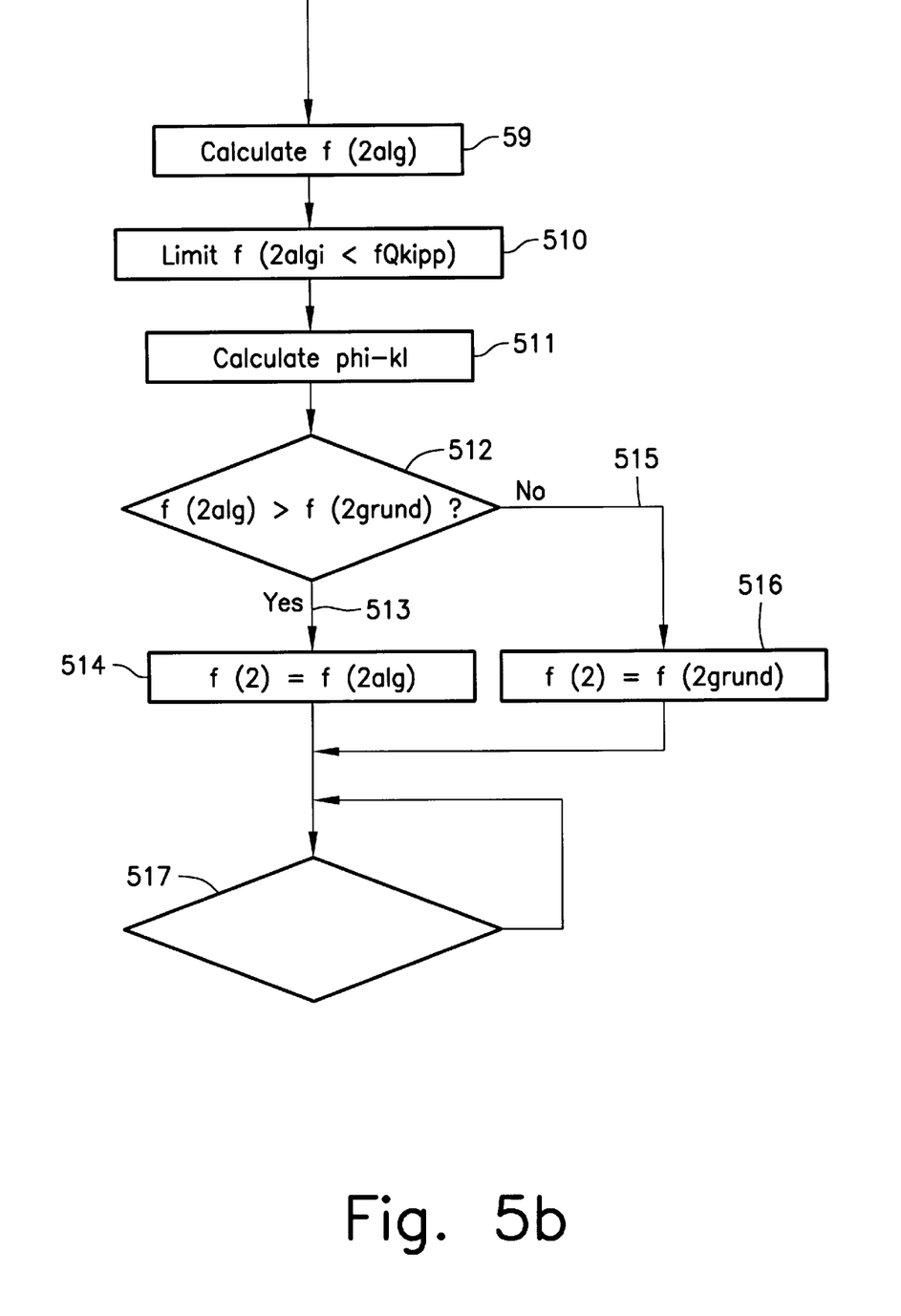

FIG. 5 schematically illustrates, using a flow chart, the manner in which the rotor frequency $f_{alg}$ is calculated.

The calculation begins at the starting point 51, and in block 52 is initialized to specific times or in specific sampling time intervals $T_A$. The current setpoint $I_1$ is defined in block 53. That is followed, in block 54, by determination of the basic rotor frequency $f_{2grund}$ corresponding thereto, based either on a table or a control characteristic curve as depicted in FIG. 3, as a function of the predefined current setpoint $I_1$. Temperature-compensated values may optionally be used in this context. Calculation of the stator voltage $U_1$ is accomplished in block 55, using, for example, $$U_1 = U_B / \sqrt{6} \qquad \text{equation (1)}$$

for a Y-connection, and powering the converter with battery voltage $U_B$. From this, in block 56, a main magnetization voltage $U_H$ is calculated as a function of the phase angle $\phi_{KL}$, which is stipulated as known, in particular from the previous calculation step. This is done using $$U_h = \sqrt{\frac{(U_1 - R_1 I_1 \cos\varphi_{kl} - \sigma X_1 I_1 \sin\varphi_{kl})^2 +}{(-R_1 I_1 \sin\varphi_{kl} + \sigma X_1 I_1 \cos\varphi_{kl})^2}} \qquad \text{equation (2)}$$

In block 57, $$U_h = 2\pi f_1 (1-\sigma(I_m)) L_1(I_m) I_m \qquad \text{equation (3)}$$

is used to calculate the magnetization current $I_m$ from a main magnetization voltage $U_H$ and the stator frequency $f_1$, if the function $G(I_m)$ as defined by $$G(I_m) = (1-\sigma(I_m)) L_1(I_m) I_m \qquad \text{equation (4)}$$

is available as a stored value. This function $G(I_m)$ encompasses all the variables dependent on the magnetization current $I_m$.

In block 58, the rotor current $I_2'$ is calculated using $$I_2' = \sqrt{I_1^2 - I_m^2} \qquad \text{equation (5)}$$

followed in block 59 by calculation of the rotor frequency $f_{2alg}$ using $$f_{2alg} = I_2' \acute{R}_2(T) f_1 / U_h \qquad \text{equation (6)}$$

here again, a temperature correction may optionally be made.

This value for the rotor frequency $f_{2alg}$ calculated with the discovered algorithm is then checked in terms of its absolute value, and in block 510 is limited to a value which is less than one corresponding to the breakover frequency $f_{kipp}$, since it is not to exceed the previously calculated value for that breakover frequency $f_{kipp}$. If the value for $f_{2alg}$ is greater than the value $f_{kipp}$, the $f_{2alg}$ is set equal to $f_{kipp}$. This ensures good efficiency, since otherwise operating points having an unnecessarily low efficiency would be selected.

Figure 6:
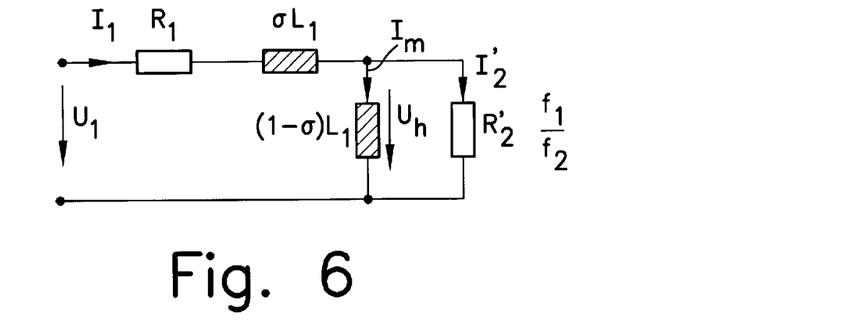
FIG. 6 shows a single-phase equivalent circuit diagram of an asynchronous machine.
Figures 7, 8:
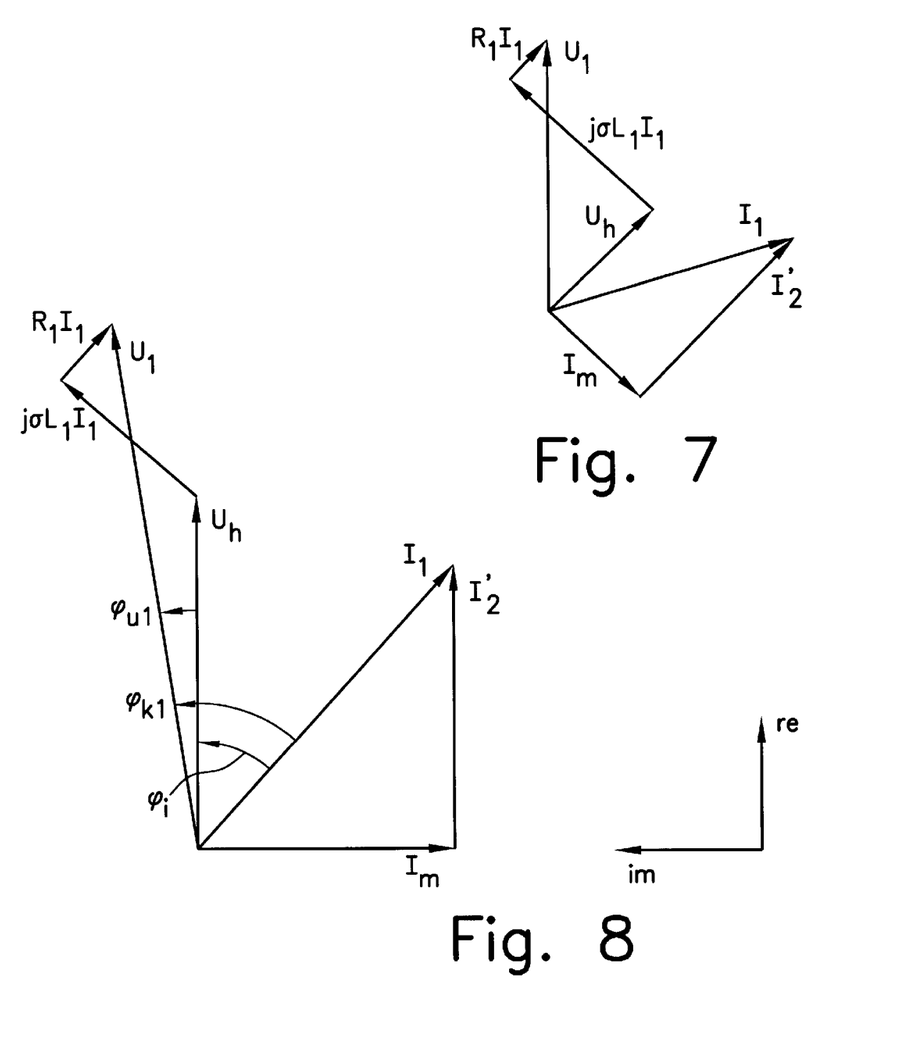
FIG. 7 shows a vector diagram corresponding to an equivalent circuit diagram.
FIG. 8. shows a vector diagram for deriving certain equations which are used to calculate the rotor frequency.

Using the values thereby determined of the vector diagram depicted in FIG. 6 and especially in FIG. 8, a calculation is then made, in block 511, of the phase angle $\phi_{KL}$, i.e. the angle between the stator voltage or phase voltage $U_1$ present at the terminals (see FIG. 6) and the impressed stator current or phase current $I_1$. This calculation yields a more accurate value for the phase angle $\phi_{KL}$ than was used previously as the basis for calculating the other variables, in particular most recently the rotor frequency $f_{2alg}$. The variables required for this, and the corresponding angles, are shown in the vector diagram of FIG. 8.

$$\phi_i = a\tan 2(I_m, I_2) \qquad \text{Equation (7)}$$

is used to determine the angle $\phi_i$ between the stator current $I_1$ and the main magnetization current $U_H$ as a function of the magnetization current $I_m$ and rotor current $I_2'$.

$$U_{1im} = -R_1 I_1 \sin\phi_i + \sigma X_1 I_1 \cos\phi_i \qquad \text{Equation (8)}$$

is used to determine a value $U_{1im}$ which is required in order to determine the angle $\phi_{U1}$ between the phase voltage $U_1$ and the main magnetization current $U_H$, and $$U_{1re} = U_h + R_1 I_1 \cos\phi_i + \sigma X_1 I_1 \sin\phi_i \qquad \text{equation (9)}$$

is used to determine a second value $U_{1re}$ which is required in order to determine the angle $\phi_{U1}$ between the phase voltage $U_1$ and the main magnetization current $U_H$. The value of the angle $\phi_{U1}$ is then calculated using $$\phi_{U1} = a\tan 2(U_{1im}, U_{1re}) \qquad \text{equation (10)}$$

The value for the phase angle $\phi_{KL}$ is then calculated from equation (11) as $$\phi_{kl} = \phi_i + \phi_{U1}$$

This value is made available in the next time segment for the next calculation of rotor frequency $f_{2alg}$.

A comparison in block 512 determines whether the calculated rotor frequency $f_{2alg}$ is greater than the basic rotor frequency $f_{2grund}$. If so, operation then branches via a Yes line 513 to block 514, and the rotor frequency $f_2$ is set equal to the calculated rotor frequency $f_{2alg}$. If not, then operation branches via a No line 515 to block 516, and the rotor frequency $f_2$ is set equal to the basic rotor frequency $f_{2grund}$.

From blocks 514 or 516, operation finally proceeds to block 517, where the established rotor frequency is used until, upon expiration of a sampling time interval $T_A$, operation ultimately returns to the starting point of the calculation sequence, and the algorithm repeats.

The variables and relationships set forth in equations (1) through (11) cited above are evident from the equivalent circuit diagram of the asynchronous machine depicted in FIG. 6. For example, the phase voltage or stator voltage $U_1$ is present at the terminals. The corresponding phase current or stator current $I_1$ flows through the Ohmic stator resistance $R_1$ and leakage inductance $\sigma L_1$, and is then distributed into the magnetization current $I_m$ and rotor current $I_2'$. The magnetization current $I_m$ causes the main magnetization voltage $U_h$ to be induced in the main inductance $(1-\sigma)L_1$. The rotor current $I_2'$ flows through the rotor resistance $R_2' f_1/f_2$, which runs parallel to the main inductance $(1-\sigma)L_1$. The vector diagram corresponding to this equivalent circuit diagram is depicted in FIG. 7 and FIG. 8, identified on the right side of FIG. 8 as to its real (re) and imaginary (im) parts. The respective electrical magnitudes and angles are indicated next to the individual arrows on the vector diagrams.

Advantageously, the present invention makes available a method that may be executed by a microprocessor and that makes it possible, for current-slip control methods, to calculate rotor frequencies in the field control speed region. This does not, in particular, negatively affect torque-optimized operation in the base speed region, since the transition between the two operating regions is not permanently predefined, but arises from the calculation or algorithm. This is important in particular for the preferred applications in electric vehicles, since the cutoff speed, i.e. the transition between the two operating modes, may fluctuate greatly due to the large fluctuations in battery voltage and also due to the special nature of torque-optimized operation. Another advantage is the avoidance of oscillations at the cutoff point.

What is claimed is:

1. A method for controlling an asynchronous machine, comprising the steps of:

determining a maximum fundamental oscillation of a stator voltage of the asynchronous machine as a function of an existing intermediate circuit voltage and battery voltage;

calculating a rotor frequency of the asynchronous machine as a function of the maximum fundamental oscillation of the stator voltage to impress a current setpoint onto the asynchronous machine;

determining a basic rotor frequency corresponding to the current setpoint and to a desired variable magnetization current as a function of a control characteristic curve;

comparing the basic rotor frequently to the calculated rotor frequency;

determining control variables for the asynchronous machine as a function of a greater one of the basic rotor frequency and the calculated rotor frequency; and controlling the asynchronous machine as a function of the determined control variables.

2. The method according to claim 1, wherein the asynchronous machine is operated by defining a corresponding rotor frequency, with variable magnetization current in a base speed region and with maximum voltage in a field control speed region, the stator current setpoint being impressed onto the asynchronous machine.

3. The method according to claim 1, wherein the step of calculating the rotor frequency is performed at specific sampling time intervals.

4. The method according to claim 1, wherein the steps of calculating the rotor frequency and determining the basic rotor frequency includes the step of using values corrected for temperature.

5. The method according to claim 1, further comprising the step of:

providing a microprocessor, to microprocessor calculation, the rotor frequency.

6. A method for controlling an asynchronous machine, comprising the steps of:

a. initializing at a sampling interval;

b. determining a current setpoint to be impressed on the asynchronous machine;

c. determining a basic rotor frequency as a function of the determined current setpoint;

d. determining a maximum fundamental oscillation of a stator voltage of the asynchronous machine;

e. determining a main magnetization voltage as a function of a phase angle;

f. determining a rotor current as a function of the main magnetization voltage;

g. calculating a rotor frequency as a function of the rotor current;

h. limiting the rotor frequency to a value lower than one corresponding to a breakover frequency;
i. calculating the phase angle;
j. determining if the calculated rotor frequency is greater than the basic rotor frequency;
k. if the calculated rotor frequency is greater than the basic rotor frequency, setting a secondary rotor frequency to the calculated rotor frequency;
l. if the calculated rotor frequency is not greater than the basic rotor frequency, setting the secondary rotor frequency to the basic frequency;
m. controlling the asynchronous machine as a function of the secondary rotor frequency; and
n. repeating steps a–m for a next sampling interval.

7. The method according to claim 6, wherein the step of determining the basic rotor frequency includes the step of:
   compensating the basic rotor frequency for temperature.

8. The method according to claim 6, wherein the asynchronous machine is operated by defining a corresponding rotor frequency, with variable magnetization current in a base speed region and with maximum voltage in a field control speed region, the stator current setpoint being impressed onto the asynchronous machine.

9. The method according to claim 6, further comprising the step of:
   providing the asynchronous machine in an electric vehicle.

* * * * *